United States Patent [19]

Shone

[11] 3,853,900
[45] Dec. 10, 1974

[54] 4-BENZYLOXY-2 (1H)-PYRIDONES
[75] Inventor: Robert L. Shone, Palatine, Ill.
[73] Assignee: G. D. Searle and Co., Chicago, Ill.
[22] Filed: Sept. 14, 1973
[21] Appl. No.: 397,233

[52] U.S. Cl. ............................. 260/297 Z, 424/263
[51] Int. Cl............................................. C07d 31/30
[58] Field of Search ................................ 260/297 Z

[56] References Cited
UNITED STATES PATENTS
2,414,783   1/1947   Wenner et al................... 260/297 Z OTHER PUBLICATIONS
Wenner et al., Chem. Abstracts, Vol. 41, 1675d–1676c, (1947).
Wenner et al., Chem. Abstracts, Vol. 41, 5904e–i, (1947).

Primary Examiner—Alan L. Rotman
Attorney, Agent, or Firm—John M. Brown

[57] ABSTRACT

Preparation of 4-benzyloxy-2(1H)-pyridones and their antimicrobial activity are disclosed.

4 Claims, No Drawings

4-BENZYLOXY-2 (1H)-PYRIDONES

This invention relates to 4-benzyloxy-2(1H)-pyridones and a process for the preparation thereof. More particularly, this invention provides new, useful, and unobvious chemical compounds of the formula

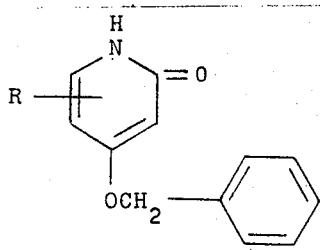

wherein R represents hydrogen or methyl ortho to the benzyloxy.

The compounds to which this invention relates are useful by reason of their valuable biological properties. Thus, for example, they are antimicrobial agents especially — but not exclusively — adapted to inhibit the growth of bacteria, protozoa, and fungi. In standardized tests for such activity versus Erwinia sp., *Tetrahymena pyriformis*, *Trichophyton mentagrophytes*, and *Verticillium albo-atrum*, the compounds of this invention were found effective in concentrations of 1,000 mcgm. per ml.

Those skilled in the art will recognize that observations of activity in standardized tests for particular biological effects are fundamental to the development of valuable new drugs, both veterinary and human.

Preparation of the instant compounds proceeds by heating a pyridine 1-oxide of the formula

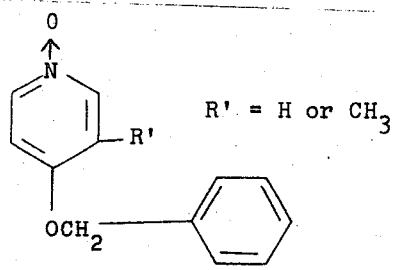

with acetic anhydride, and heating the resultant intermediate with methanol in ethyl acetate.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

4-Benzyloxy-2(1H)-pyridone

A mixture of 185 parts of 4-benzyloxypyridine-1-oxide and 1,100 parts of acetic anhydride is heated at the boiling point under reflux for 2 hours, whereupon the acetic anhydride is stripped by vacuum distillation. The dark syrupy residue is taken up in 900 parts of ethyl acetate, and the resultant solution is filtered. The filtrate is heated with approximately 50 parts of methanol at the boiling point under reflux for 5 minutes, whereupon the reaction mixture is allowed to cool to room temperature. Insoluble solids are filtered off and recrystallized from a mixture of ethyl acetate and ethanol, using decolorizing charcoal in process. The vanilla-colored product thus isolated is 4-benzyloxy-2(1H)-pyridone, melting at approximately 201°–202°.

EXAMPLE 2

4-Benzyloxy-3-methyl-2(1H)-pyridone and 4-benzyloxy-5-methyl-2(1H)-pyridone

A mixture of 97 parts of 4-benzyloxy-3-methylpyridine 1-oxide and 400 parts of acetic anhydride is heated at the boiling point under reflux for 3 hours. The anhydride is thereupon removed by vacuum distillation, and the dark residue is extracted with 450 parts of ethyl acetate. A small amount of insoluble material is removed by filtration. The filtrate is mixed with approximately 25 parts of methanol, and the resultant solution is heated at the boiling point under reflux for 5 minutes. Solvent is stripped by vacuum distillation, and the dark residue is dissolved in chloroform. The chloroform solution is chromatographed on silica gel, using chloroform and then a 1 percent solution of ethanol in chloroform as developing solvents. From the primarly ethanol-chloroform eluates, on evaporation of solvent, 4-benzyloxy-3-methyl-2(1H)-pyridone melting at approximately 214°–215° is obtained. Subsequent ethanolchloroform eluates, on evaporation of solvent, afford 4-benzyloxy-5-methyl-2(1H)-pyridone melting in the range 145°–150°.

What is claimed is:

1. A compound of the formula

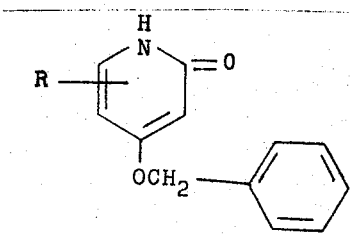

wherein R represents hydrogen or methyl ortho to the benzyloxy.

2. A compound according to claim 1 which is 4-benzyloxy-2(1H)-pyridone.

3. A compound according to claim 1 which is 4-benzyloxy-3-methyl-2(1H)-pyridone.

4. A compound according to claim 1 which is 4-benzyloxy-5-methyl-2(1H)-pyridone.

* * * * *